US008207250B2

(12) United States Patent
Souma et al.

(10) Patent No.: US 8,207,250 B2
(45) Date of Patent: Jun. 26, 2012

(54) POLYCARBONATE RESIN COMPOSITION AND PROCESS FOR PRODUCING THE SAME

(75) Inventors: Minoru Souma, Yokohama (JP); Katsumi Morohoshi, Yokohama (JP); Tomohiro Itou, Yokohama (JP); Yasuaki Kai, Yokohama (JP); Hironobu Muramatsu, Yokohama (JP); Takashi Oda, Ebina (JP); Haruo Unno, Yokosuka (JP); Kenji Uesugi, Miura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/669,286

(22) PCT Filed: Jul. 10, 2008

(86) PCT No.: PCT/JP2008/062482
§ 371 (c)(1), (2), (4) Date: Jun. 11, 2010

(87) PCT Pub. No.: WO2009/011278
PCT Pub. Date: Jan. 22, 2009

(65) Prior Publication Data
US 2010/0256270 A1    Oct. 7, 2010

(30) Foreign Application Priority Data
Jul. 17, 2007    (JP) .................................. 2007-185846

(51) Int. Cl.
*C08K 5/42* (2006.01)
*C08K 3/18* (2006.01)
(52) U.S. Cl. ........................................ 524/157; 524/430
(58) Field of Classification Search .................... 524/157
See application file for complete search history.

(56) References Cited

U.S. PATENT DOCUMENTS

| 6,846,435 | B1 | 1/2005 | Bohnen et al. | |
|---|---|---|---|---|
| 7,476,440 | B2* | 1/2009 | Oda et al. | 428/329 |
| 2006/0047045 | A1 | 3/2006 | Oda et al. | |
| 2006/0058426 | A1* | 3/2006 | Oda et al. | 523/210 |
| 2006/0289841 | A1* | 12/2006 | Ito et al. | 252/512 |
| 2009/0326097 | A1 | 12/2009 | Fujita et al. | |

FOREIGN PATENT DOCUMENTS

| JP | 2003-054941 A | 2/2003 |
|---|---|---|
| JP | 2003-517418 A | 5/2003 |
| JP | 2004-149687 A | 5/2004 |
| JP | 2005-528474 A | 9/2005 |
| JP | 2006-062905 A | 3/2006 |
| JP | 2006-143487 A | 6/2006 |
| JP | 2006-193400 A | 7/2006 |
| JP | 2007-002089 A | 1/2007 |
| JP | 2007002089 A * | 1/2007 |
| JP | 2007-031684 A | 2/2007 |
| JP | 2008-163230 A | 7/2008 |
| WO | WO 2008/016048 A1 | 2/2008 |

OTHER PUBLICATIONS

Translation of JP2007-002089, Jan. 2007.*
JIS K 7210, "Testing Method for Melt Flow Rate of Thermoplastics", 1976, pp. 590-604.
JIS K 7113, "Testing method for tensile properties of plastics", 1995, pp. 1-19.
JIS K 7171, "Plastics—Determination of flexural properties", 2008, pp. 1-24.
JIS K 7105, "Testing Methods for Optical Properties of Plastics", 1981, 1-34.

* cited by examiner

*Primary Examiner* — Ling Choi
*Assistant Examiner* — Hui Chin
(74) *Attorney, Agent, or Firm* — Foley & Lardner LLP

(57) ABSTRACT

There is provided a polycarbonate resin composition containing aluminum oxide nanoparticles and being capable of showing good moldability and retention heat stability and combining high transparency and dimensional stability with excellent mechanical properties. The polycarbonate resin composition is characterized by containing an organic acid and aluminum oxide and in that: the resin composition has a melt mass flow rate of 11 g/10 min or higher as measured according to JIS K 7210 under the conditions of a temperature of 280° C., a nominal load of 2.16 Kg and a nozzle dimension L/D of 8/2; and a No. 2 dumbbell-shaped specimen according to JIS K 7113 formed by heat-press molding the resin composition into a film of 0.2 mm in thickness and cutting the film has a breaking stress of 8 MPa or higher as measured under the conditions of a temperature of 23° C., a humidity of 50% RH and a tensile rate of 50 mm/min. The organic acid is preferably an organic sulfonic acid having a carbon number of 8 or greater, more preferably the one containing an aromatic ring in the molecule.

10 Claims, No Drawings

POLYCARBONATE RESIN COMPOSITION AND PROCESS FOR PRODUCING THE SAME

FIELD OF THE INVENTION

The present invention relates to a polycarbonate resin composition containing aluminum oxide and a production process thereof. More particularly, the present invention relates to a polycarbonate resin composition containing surface-treated aluminum oxide nanoparticles and having good transparency and mechanical properties and a production process thereof.

BACKGROUND OF THE INVENTION

Attempts have been made to add fillers into resins for improvements in the mechanical strength, dimensional stability and thermal resistance etc. of the resins. Although a glass fiber is widely used as a reinforcement for resins, it is difficult to obtain a transparent material from the resin and the glass fiber due to the difference in reflective index between the glass fiber and the resin and the size of the glass fiber and is thus difficult to use the glass fiber in a material, such as an automotive window material, for which transparency is required.

As a solution to this problem, there is a demand for a filler having a smaller reflective index difference to a resin and being finer in particle size and capable of being dispersed uniformly in the resin. In view of the fact that aluminum oxide has a small reflective index difference to a polycarbonate resin, it is expected that a composition of the polycarbonate resin and aluminum oxide can be provided with good transparency.

Various proposals have been made on the use of aluminum oxide as a filler in resins. For example, Patent Document 1 teaches a resin composition in which a resin is melt-mixed by a mixer with needle-like boehmite particles or needle-like alumina particles having a particle length of 1 to 10 μm and an aspect ratio of 40 to 70. This resin composition cannot however show sufficient transparency as the needle-shaped particles used has a much larger size than the wavelength of visible light and insufficient dispersibility to the resin.

Patent Documents 2 and 3 teach resin compositions containing needle-like aluminum oxide nanoparticles. More specifically, Patent Document 2 teaches a polycarbonate resin composition containing aluminum oxide nanoparticles and having good transparency and mechanical properties. According to studies made by the present inventors, however, it can hardly be said that the resin composition of Patent Document 2 is suitable for use as the material where low linear thermal expansion coefficient is required such as automotive window material since the aluminum oxide particles added are small in amount and insufficient in dispersibility.

Patent Document 3 teaches a resin composition in which needle-like boehmite particles without surface treatment are dispersed in a resin. According to studies made by the present inventors, it has however been found that: in order for the particles without substantial surface treatment to be dispersed in the resin so as not to cause aggregation of the particles, the resin is limited to that having a strong polar group or groups in its polymer chain structure (e.g. polyamide, thermoplastic polyurethane); and the aggregation of the particles cannot be avoided in the case of the polycarbonate resin with relatively weak polarity. It has further been found that the mechanical properties of the resin composition significantly deteriorate as the molecular weight of the polycarbonate resin becomes decreased under the catalysis of the boehmite.

There are known some techniques to modify aluminum oxide for improvement in dispersibility. (See e.g. Patent Documents 4 and 5.) In the dispersibility improvement technique of Patent Document 4, the aluminum oxide is surface treated with a silane coupling agent. It has been confirmed that, in the case of treating the aluminum oxide with a trifunctional silane coupling agent as taught in the above document and blending the treated aluminum oxide in the resin, the aggregation of the aluminum oxide in the resin composition cannot be avoided so that the transparency of the resin composition becomes impaired. It has been further confirmed by the present inventors that, in the case of treating the aluminum oxide with a silane coupling agent having a basic or acid functional group or groups and bending the treated aluminum oxide in a polycarbonate resin, the mechanical properties of the resin composition becomes impaired due to the decrease in the molecular weight of the polycarbonate resin.

In the technique of Patent Document 5, the aluminum oxide is treated with a sulfonic acid. It has been found by the present inventors that, in the case of treating the aluminum oxide with a sulfonic acid having a carbon number of 7 or less (e.g. p-toluenesulfonic acid) and blending the treated aluminum oxide in a polycarbonate resin, the molecular weight of the polycarbonate resin becomes decreased due to the insufficient modification of the aluminum oxide; the resulting resin composition cannot show sufficient melt fluidity during molding; and there may arise problems such as dissolution of metal components from a production apparatus (e.g. a biaxial extruder) by the metal corrosivity of the sulfonic acid having a carbon number of 7 or less.

Further, Patent Document 6 teaches a polycarbonate resin composition containing a composite material of alumina particles to which a phosphoric ester is chemically bonded. It has been found by the present inventors that the composite material of the alumina particles and the phosphoric ester has the problem that the phosphoric ester cannot be bonded stably to the alumina particles at a molding temperature of the resin composition (e.g. 250° C. or higher), thereby resulting in performance deteriorations of the resin composition (such as aggregation of the alumina particles and hydrolysis of the polycarbonate resin).

Patent Documents 7 and 8 teach polycarbonate resin compositions containing composite materials of alumina particles to which alkylbenzenesulfonic acids are chemically bonded. It has been found by the present inventors that: these polycarbonate resin compositions fail not only to prevent hydrolysis of the polycarbonate resin by the alumina particles, but to show improved melt fluidity due to the strong interaction between the alumina particles, as the amount of the alkylbenzenesulfonic acid used is so small that the alumina particles cannot be sufficiently coated with the alkylbenzenesulfonic acid.

As mentioned above, various researches have been made to improve the characteristics properties of the polycarbonate resin composition containing the aluminum oxide nanoparticles. However, there has not yet been developed any polycarbonate resin composition that combines high transparency and dimensional stability with excellent mechanical properties and moldability.

Patent Document 1: Japanese Laid-Open Patent Publication No. 2003-054941

Patent Document 2: Japanese Laid-Open Patent Publication No. 2006-062905

Patent Document 3: Japanese Publication of International Patent Application No. 2005-528474

Patent Document 4: Japanese Laid-Open Patent Publication No. 2004-149687

Patent Document 5: Japanese Publication of International Patent Application No. 2003-517418

Patent Document 6: Japanese Laid-Open Patent Publication No. 2007-031684

Patent Document 7: Japanese Laid-Open Patent Publication No. 2007-002089

Patent Document 8: Japanese Laid-Open Patent Publication No. 2006-193400

It is therefore an object of the present invention to provide a polycarbonate resin composition containing aluminum oxide nanoparticles and being capable of showing good moldability and retention heat stability (hereinafter occasionally just referred to "heat stability") during production and molding of the resin composition and combining high transparency and dimensional stability with excellent mechanical properties.

SUMMARY OF THE INVENTION

As a result of extensive researches to accomplish the above object, the present inventors have found that: aluminum oxide nanoparticles surface treated with a specific organic acid are capable of attaining high dispersibility to a polycarbonate resin and, because of such high dispersibility, showing good molding fluidity and moldability, and present no problem of a hydrolysis of the polycarbonate resin during mixing of the polycarbonate resin with the aluminum oxide nanoparticles so that it is possible to provide a polycarbonate resin composition with good mechanical properties by limiting a decrease in molecular weight of the polycarbonate resin. The present invention is made based on this finding.

Namely, the present invention (claim 1) provides a polycarbonate resin composition containing an organic acid and aluminum oxide, characterized in that: the resin composition has a melt mass flow rate of 11 g/10 min or higher as measured according to JIS K 7210 under the conditions of a temperature of 280° C., a nominal load of 2.16 Kg and a nozzle dimension UD of 8/2; and a No. 2 dumbbell-shaped specimen according to JIS K 7113 formed by heat-press molding the resin composition into a film of 0.2 mm in thickness and cutting the film has a breaking stress of 8 MPa or higher as measured under the conditions of a temperature of 23° C., a humidity of 50% RH and a tensile rate of 50 mm/min.

The polycarbonate resin composition of the present invention (claim 2) is characterized in that, in addition to the configuration of claim 1, the film of 0.2 mm in thickness formed by heat-press molding the resin composition has an elastic modulus of 2.7 GPa or higher as measured according to JIS K 7171 under the conditions of a temperature of 23° C. and a humidity of 50% RH.

The polycarbonate resin composition of the present invention (claim 3) is characterized in that, in addition to the configuration of claim 1 or 2, the film of 0.2 mm in thickness formed by heat press-molding the resin composition has a haze value of 20 or smaller as measured according to JIS K 7105.

The polycarbonate resin composition of the present invention (claim 4) is characterized in that, in addition to the configuration of any one of claims 1 to 3, the organic acid is a sulfonic acid having a carbon number of 8 or greater.

The polycarbonate resin composition of the present invention (claim 5) is characterized in that, in addition to the configuration of any one of claims 1 to 4, the organic acid has an aromatic ring in its molecule.

The polycarbonate resin composition of the present invention (claim 6) is characterized in that, in addition to the configuration of any one of claims 1 to 5, the organic acid is contained in an amount of 5 parts by weight or more per 100 parts by weight of the aluminum oxide.

The polycarbonate resin composition of the present invention (claim 7) is characterized in that, in addition to the configuration of any one of claims 1 to 6, the aluminum oxide is contained in an amount of 3 to 70% by weight.

The polycarbonate resin composition of the present invention (claim 8) is characterized in that, in addition to the configuration of any one of claims 1 to 7, the aluminum oxide has an aspect ratio of 5 or greater.

The polycarbonate resin composition of the present invention (claim 9) is characterized in that, in addition to the configuration of any one of claims 1 to 8, the aluminum oxide is one kind or two or more kinds selected from the group consisting of boehmite and pseudo boehmite.

The present invention (claim 10) provides a production process of a polycarbonate resin composition, characterized in that: the process includes treating aluminum oxide with an organic acid having a carbon number of 8 or greater, and then, mixing the aluminum oxide with a polycarbonate resin.

The polycarbonate resin composition production process of the present invention (claim 11) is characterized in that, in addition to the configuration of claim 10, the mixing of the aluminum oxide and the polycarbonate resin is performed using a dispersion liquid of the aluminum oxide and/or a solution of the polycarbonate resin.

The polycarbonate resin composition production process of the present invention (claim 12) is characterized in that, in addition to the configuration of claim 10, the mixing of the aluminum oxide and the polycarbonate resin is performed by melt-mixing the polycarbonate resin with a powder of the aluminum oxide.

In the present invention, the polycarbonate resin composition is produced by surface treating the aluminium oxide with the specific organic acid and then blending the aluminum oxide in the polycarbonate resin. It is therefore possible to provide the polycarbonate resin composition with improved mechanical strength and dimensional stability while maintaining the high transparency of the polycarbonate resin and making use of the conventional characteristic properties of the aluminum oxide/polycarbonate resin composition. It is further possible, in the presence of a bulky organic group in the organic acid, to improve the melt fluidity and heat resistance of the polycarbonate resin composition and limit the corrosivity of the organic acid to metal material. In consequence, the aluminum oxide nanoparticle-containing polycarbonate resin composition of the present invention is capable of attaining good mechanical properties, transparency and dimensional stability and improved melt fluidity, heat stability and ease of handling.

DETAILED DESCRIPTION

The polycarbonate resin composition and its production process of the present invention will be described in detail below by way of the following embodiment. It is herein noted that the constituent features described below are merely one embodiment (typical example) of the present invention and are not intended to limit the present invention thereto as long as these features fall within the scope of the present invention.

[Organic Acid]

The organic acid usable in the present invention has at least one acid group and any other constituent group.

There is no particular restriction on the organic acid. Preferred examples of the organic acid are those having high adsorptive activity against aluminum oxides, such as organic sulfonic acid, organic phosphonic acid, organic phosphoric ester and carboxylic acid. Among others, organic sulfonic acid, organic phosphonic acid and organic phosphoric ester are particularly preferred. Most preferred is sulfonic acid.

The constituent group, other than the acid group, of the organic acid (hereinafter referred to as "organic group") is preferably selected in such a manner that the organic acid has a carbon number of 8 or greater in terms of the improvements in the melt fluidity and heat stability of the polycarbonate resin composition. In order to improve the melt fluidity and heat stability of the polycarbonate resin composition, it is preferable that the organic group has a larger bulk size. More preferably, the organic group is selected in such a manner that the organic acid has a carbon number of 10 or greater, still more preferably 15 or greater. There is no particular restriction on the upper limit of the carbon number of the organic acid. The carbon number of the organic acid is generally 50 or less, preferably 30 or less, in order to avoid deterioration in the linear thermal expansion coefficient of the resin composition.

In order to maintain the linear thermal expansion coefficient and elastic modulus of the resin composition at the same level as those of a conventional aluminum oxide/polycarbonate resin composition, it is preferable that the organic group has a rigid structure. More specifically, it is preferable that the organic group contains an aromatic ring (such as benzene ring, naphthalene ring, anthracene ring, phenanthrene ring or pyrene ring). It is particularly preferable that the organic group contains a benzene ring or a naphthalene ring. The aromatic ring of the organic acid may have a substituent. The substituent is preferably the one having a bulky structure within a range that does not cause deterioration in the mechanical properties of the resin composition in terms of the melt fluidity. Examples of the substituent are alkyl, alkoxy, allyl and aryl.

Specific examples of the organic acid usable in the present invention are listed as follows.

<Organic Sulfonic Acid>

Examples of the organic sulfonic acid are: alkanesulfonic acids (such as octane sulfonic acid and dodecane sulfonic acid); benzenesulfonic acids (such as dodecylbenzenesulfonic acid, dimethylbenzenesulfonic acid and biphenylbenzenesulfonic acid); naphthalenesulfonic acids (such as dinonylnaphthalenesulfonic acid and naphthalenedisulfonic acid); anthracenesulfonic acids (such as anthracenesulfonic acid); and phenanthrenesulfonic acids (such as phenanthrenesulfonic acid).

<Organic Phosphonic Acid and Organic Phosphoric Ester>

Examples of the organic phosphoric acid and the organic phosphoric ester are: alkyl phosphoric acids (such as octyl phosphoric acid and dodecyl phosphoric acid); alkyl phosphates (such as bis(butoxyethyl) phosphate, dibutyl phosphate and dihexyl phosphate); phenyl phosphoric acids (such as octylphenyl phosphoric acid and dodecylphenyl phosphoric acid); aryl phosphates (such as phenyl phosphate, (dimethylphenyl) phosphate and naphthyl phosphate), naphthalene phosphoric acids (such as naphthalene phosphoric acid), anthracene phosphoric acids (such as anthracene phosphoric acid) and phenanthrene phosphoric acids (such as phenanthrene phosphoric acid).

<Carboxylic Acid>

Examples of the carboxylic acid are: aliphatic carboxylic acids (such as decanoic acid and dodecanoic acid); benzoic acids (such as dodecyl benzoic acid); naphthalene carboxylic acids (such as naphthalenecarboxylic acid); anthracesne carboxylic acids (such as anthracenecarboxylic acid); and phenanthrene carboxylic acids (such as phenanthrenecarboxylic acid).

These organic acids can be used solely or in combination of two or more thereof.

In terms of the adsorptivity of the organic acid to the aluminum oxide nanoparticles, the dispersibility of the aluminum oxide nanoparticles in the polycarbonate resin composition, the melt fluidity of the polycarbonate resin composition, the effect of preventing thermal decomposition of the resin and the mechanical properties of the resin composition, preferred are benzenesulfonic acids, naphthalenesulfonic acids, phenyl phosphoric acids and phenyl phosphates each having long-chain alkyl substituent groups. Among others, dodecylbenzenesulfonic acid and dinonylnaphthalenesulfonic acid are especially preferred.

In the present invention, a plurality of organic acids can be used in combination as long as they do not substantially interferes with the object of the present invention. For example, it is conceivable to use two or more kinds of organic acids having a carbon number of 8 or greater, or use one, or two or more kinds of organic acids having a carbon number of 8 or greater together with one, or two or more kinds of organic acids having a carbon number of 7 or smaller. In the case of using the organic acid or acids having a carbon number of 8 or greater in combination with the organic acid or acids having a carbon number of 7 or smaller, the amount of the organic acid or acids having a carbon number of 7 or smaller is 70 mol % or less, preferably 50 mol % or less, more preferably 30 mol % or less, still more preferably 10 mol % or less, based on the total amount of the organic acids in order to sufficiently obtain the above-mentioned effect of the organic acid or acids having a carbon number of 8 or greater.

[Aluminum Oxide]

The aluminum oxide usable in the present invention is represented by the following formula (I) and is usually in the form of a single kind or a mixture of two or more kinds.

$$Al_2O_3 \cdot nH_2O \qquad (I)$$

More specifically, the aluminum oxide of the above formula (I) is: aluminum oxide of δ-, γ-, θ-, or α-type when n=1; boehmite when n=1; a mixture of boehmite and alumina hydrate, generally called "pseudo boehmite" when n is larger than 1 and smaller than 3; aluminium hydroxide when n=3; and alumina hydrate when n is larger than 3.

Among others, boehmite and pseudo boehmite are preferred in terms of the availability, particle dispersibility and refractive index.

The particles of the aluminum oxide usable in the present invention can be of any shape such as fiber shape, rod shape, needle shape, cylindrical shape or column shape. It is preferable that the aluminum oxide particles are nanoparticles having a minor axis length of 1 to 10 nm, a major axis length of 20 to 400 nm and an aspect ratio (a length-to-width ratio) of 5 or greater.

The above aluminum oxide nanoparticles can be prepared by the methods disclosed in Patent Documents 1 and 2.

Herein, the particle size of the aluminum oxide nanoparticles can be determined by observation with a transmission electron microscope (TEM) in the present invention. The minor axis length of the particles means: a diameter when the particles are of rod shape, fiber shape etc.; and a thickness when the particles are of plate shape etc. The major axis length of the particles means: a length when the particles are of rod shape, fiber shape etc.; and a maximum length when the particles are of plate shape etc. The aspect ratio is determined by dividing the major axis length by the minor axis length.

[Surface Treatment of Aluminum Oxide]

In the present invention, the polycarbonate resin composition obtains good fluidity, transparency, mechanical properties and heat stability by surface treatment of the aluminum oxide with the organic acid. Preferably, the aluminum oxide is surface treated with the organic acid having a carbon number of 8 or greater in order to provide the polycarbonate resin composition with better fluidity, transparency, mechanical properties and heat stability. For example, the surface treatment of the aluminum oxide with the organic acid can be performed by the following techniques.

<Addition of Organic Acid to Aqueous Dispersion Liquid of Aluminum Oxide]

One of the surface treatment techniques is to add the organic acid to an aqueous dispersion liquid (sol) of the aluminum oxide by e.g. dropping the organic acid into the aqueous dispersion liquid of the aluminum oxide, or dropping the aqueous dispersion liquid of the aluminum oxide into the organic acid while stirring the organic acid or keeping the organic acid still. At this time, the organic acid can be and is preferably diluted in advance with water or an organic solvent.

There is no particular restriction on the concentration of the aluminum oxide in the aqueous aluminum oxide dispersion liquid. In order to effectively surface treat the aluminum oxide itself, the concentration of the aluminum oxide in the aqueous aluminum oxide dispersion liquid is preferably lean, more preferably 80 wt % or less, still more preferably 50 wt %. In general, the concentration of the aluminum oxide in the aqueous aluminum oxide dispersion liquid is 0.1 wt % or more in terms of the treatment efficiency.

The treatment temperature during dropping of the organic acid or the aqueous aluminum oxide dispersion liquid is not particularly restricted and is generally 5 to 100° C., preferably 10 to 80° C.

After the completion of the dropping, the mixed solution can be left still or kept stirred in order to optimize the surface treatment condition of the aluminum oxide (i.e. to surface treat the aluminum oxide uniformly) by adsorption and desorption of the organic acid to and from the aluminum oxide. In this case, the treatment temperature is not particularly restricted and is preferably 5 to 100° C. The treatment time is not also particularly restricted and is preferably 10 minutes to 240 hours.

After the above treatment, the organic acid-treated aluminum oxide can be extracted as solid matter by any water removing process (e.g. distillation by heating, freeze drying, spray drying, slurry drying, filtration etc.).

In terms of the dispersibility of the aluminum oxide in the polycarbonate resin composition, it is preferable to extract the aluminum oxide as solid matter in a state where the aggregation of the particles is minimized e.g. in powder form by freeze drying, spray drying or slurry drying.

The organic acid-treated aluminum oxide can also be extracted in the form of a dispersion liquid (sol) by any solvent exchange process e.g. distillation based on boiling point difference, ultrafiltration etc., or by redispersing the solid matter of the organic acid-treated aluminum oxide in any desired organic solvent. In the case of redispersing the solid matter of organic acid-treated aluminum oxide in the desired organic solvent by ultrafiltration, it is conceivable to circulate the aqueous dispersion liquid (sol) of the aluminum oxide in an ultrafiltration system so as to recover a filtrate by a filter through which the aluminum oxide does not pass, while adding the desired organic solvent into the circulation system, and to thereby gradually replace the dispersant of the circulated liquid with the desired organic solvent.

<Addition of Organic Acid to Organic Solvent Dispersion Liquid of Aluminum Oxide>

Another surface treatment technique is to add the organic acid to an organic solvent dispersion liquid (sol) of the aluminum oxide e.g. by dropping the organic acid into the organic solvent dispersion liquid of the aluminum oxide, or dropping the organic solvent dispersion liquid of the aluminum oxide into the organic acid while stirring the organic acid or keeping the organic acid still. The organic acid can be and is preferably be diluted in advance with water or an organic solvent.

There is no particular restriction on the organic solvent used for preparation of the organic solvent dispersion liquid of the aluminum oxide as long as the organic solvent can be removed in the subsequent process. Examples of the organic solvent are: alcohols such as methanol, ethanol, isopropanol, butanol and ethylene glycol; ethers such as diethylene glycol dimethyl ether, tetrahydrofuran, 1,3-dioxolan and 1,4-dioxane; toluene; xylene; heptane; octane; dimethylformamide; dimethyl sulfoxide; cyclohexanone; anisole; chloroform; dichloromethane; dichloroethane; chlorobenzene; dichlorobenzene; and N-methylpyrrolidone. These solvents can be used solely or in combination of two or more thereof. A mixed solution of water and organic solvent can alternatively be used.

There is also no particular on the concentration of the aluminum oxide in the aluminum oxide organic solvent dispersion liquid. In order to effectively surface treat the aluminum oxide itself, the concentration of the aluminum oxide in the aluminum oxide organic solvent dispersion liquid is preferably lean, more preferably 80 wt % or less, still more preferably 50 wt %. In general, the concentration of the aluminum oxide in the aluminum oxide organic solvent dispersion liquid is 0.1 wt % or more in terms of the treatment efficiency.

The treatment temperature during dropping of the organic acid or the aluminum oxide organic solvent dispersion liquid is not particularly restricted and is generally 5 to 200° C., preferably 10 to 150° C.

After the completion of the dropping, the mixed solution can be left still or kept stirred in order to optimize the surface treatment condition of the aluminum oxide (i.e. to surface treat the aluminum oxide uniformly) by adsorption and desorption of the organic acid to and from the aluminum oxide. In this case, the treatment temperature is not particularly restricted and is preferably 10 to 160° C. The treatment time is not also particularly restricted and is preferably 10 minutes to 240 hours.

After the above treatment, the organic acid-treated aluminum oxide can be extracted as solid matter by any water removing process (e.g. the same water removing process as in the above-mentioned aqueous system). The organic acid-treated aluminum oxide can also be extracted in the form of a dispersion liquid (sol) with another organic solvent by any solvent exchange process e.g. distillation based on boiling point difference, ultrafiltration etc., or by redispersing the solid matter of the organic acid-treated aluminum oxide in the desired organic solvent.

<Direct Contact of Aluminum Oxide in Powder Form with Organic Acid]

Still another surface treatment technique is to make direct contact of the aluminum oxide in powder form with the organic acid by e.g. dropping the organic acid to the aluminum oxide powder, or dropping the aluminum oxide powder to the organic acid while stirring the organic acid or keeping the organic acid still. The organic acid can be and is preferably diluted in advance with water or an organic solvent.

It is preferable to treat the aluminum oxide powder with the organic acid by stirring (e.g. through the use of a mixer such as a Henschel mixer) for effective surface treatment of the aluminum oxide with the organic acid. It is also preferable that the aluminum oxide powder is in a state where the aggregation of the primary particles is minimized to ensure a large surface area e.g. powder form obtained by freeze drying, spray drying or slurry drying. The aluminum oxide powder may be in a wet state where a moderate amount of starting solvent such as water remains without causing particle aggregation.

The temperature of contact of the aluminum oxide with the organic acid is not particularly restricted and is generally 5 to 200° C., preferably 10 to 150° C.

After the above treatment, the aluminum oxide can be extracted in the form of a dispersion liquid (sol) by redispersing the organic acid-treated aluminum oxide in any desired organic solvent.

<Ratio of Organic Acid Used>

For the above-mentioned surface treatment of the aluminum oxide with the organic acid, the amount of the organic acid used relative to the amount of the aluminum oxide is preferably 0.01 to 200 wt %. The amount of the organic acid used relative to the amount of the aluminum oxide is more preferably 0.1 to 100 wt % in order to provide the polycarbonate resin composition with good fluidity, transparency, heat stability and mechanical properties. If the amount of the organic acid used relative to the amount of the aluminum oxide is less than 0.01 wt %, the organic acid cannot produce a sufficient effect to impart good fluidity, transparency, heat stability and mechanical properties to the polycarbonate resin composition. If the amount of the organic acid used relative to the amount of the aluminum oxide exceeds 200 wt %, the influence of excessive, unreacted organic acid on the surface of the aluminum oxide becomes large so that there arise problems such as deterioration in the mechanical properties of the polycarbonate resin composition and deterioration in the retention heat stability due to the decomposition of the polycarbonate resin by excessive organic acid and the increase in volatile content.

It is particularly preferable that the amount of the organic acid used is 5 parts by weight or more, more preferably 7 parts by weight or more, per 100 parts by weight of the aluminum oxide as will be described below. If the amount of the organic acid used relative to the amount of the aluminum oxide is too small, the organic acid cannot cover the surface of the aluminum oxide uniformly and sufficiently and thus cannot produce a sufficient modification effect to secure the fluidity of the polycarbonate resin composition, the dispersibility of the aluminum oxide (the transparency of the polycarbonate resin composition) and the heat stability (hydrolysis prevention capability) of the polycarbonate resin composition. On the other hand, it is preferable that the amount of the organic acid used is 200 parts by weight or less, more preferably 100 parts by weight or less, per 100 parts by weight of the aluminum oxide. If the amount of the organic acid used relative to the amount of the aluminum oxide is too large, the influence of excessive, unreacted organic acid on the surface of the aluminum oxide becomes large so that there arise problems such as deterioration in the mechanical properties of the polycarbonate resin composition, decomposition of the polycarbonate resin by excessive organic acid and increase in volatile content (appearance defect factor).

In general, the amount of the organic acid used in the surface treatment of the aluminum oxide is equal to the amount of the organic acid adhered to the aluminum oxide after the surface treatment and is equal to the after-mentioned content percentage of the organic acid to the aluminum oxide of the polycarbonate resin composition.

[Polycarbonate Resin]

The polycarbonate (PC) resin is a copolymer produced by reaction of a carbonic acid ester such as bis(alkyl)carbonate, bis(aryl)carbonate or phosgene with one or more kinds of bisphenol containing trivalent or more polyphenol as copolymerization component.

The polycarbonate resin may be produced in the form of an aromatic polyester carbonate as needed by using, as copolymerization component, an aromatic dicarboxylic acid such as terephthalic acid or isophthalic acid or a derivative thereof (such as aromatic dicarboxylic acid ester or aromatic dicarboxylic acid chloride).

Examples of the bisphenol are bisphenol A, bisphenol C, bisphenol E, bisphenol F, bisphenol M, bisphenol P, bisphenol S and bisphenol Z. (For the abbreviations, refer to "Reagent Catalog" of Aldrich, Inc.) Among others, preferred are bisphenol A and bisphenol Z (each of which has a central carbon as a part of the cyclohexane ring). Bisphenol A is particularly preferred.

Examples of the copolymerizable trivalent phenol are 1,1, 1-(4-hyroxyphenyl)ethane and phloroglucinol.

The polycarbonate resin can be a single resin or a blend of two or more kinds of polymers, or can be a copolymer of plural kinds of monomers.

There is no particular restriction on the method of production of the polycarbonate resin. The polycarbonate resin can be produced by a known technique e.g. any of the following techniques (a) to (d).

(a) Interfacial polymerization method using as raw materials an alkali metal salt of bisphenol and a carbonic acid ester derivative (e.g. phosgene) active to nucleophilic attack and causing polycondensation of the raw materials at an interface between an organic solvent (e.g. methylene chloride etc.) in which a product polymer is to be dissolved and an alkaline water.

(b) Pyridine method using as raw materials a bisphenol and a nucleophilically active carbonic acid ester derivative mentioned above and causing polycondensation of the raw materials in an organic base such as pyridine.

(c) Melt polymerization method using bisphenol and carbonic ester such as bis(alkyl)carbonate or bis(aryl)carbonate (preferably, diphenyl carbonate) as raw materials and causing melt polycondensation of the raw materials.

(d) Production method using bisphenol and carbon monoxide or carbon dioxide as raw materials.

There is also no particular restriction on the molecular weight of the polycarbonate resin. In general, the polycarbonate resin preferably has a weight-average molecular weight Mw of 10000 to 500000 as measured by GPC (gel permeation chromatography) on a polystyrene basis. The weight-average molecular weight Mw of the polycarbonate resin is more preferably 15000 to 200000, still more preferably 20000 to 100000, in terms of the mechanical properties and melt fluidity.

Further, the polycarbonate resin usually has a glass transition temperature Tg of 120 to 220° C., preferably 130 to 200° C., more preferably 140 to 190° C. in terms of the heat resistance and melt fluidity.

[Polycarbonate Resin Composition]

The polycarbonate resin composition of the present invention contains the organic acid, which is preferably sulfonic acid having a carbon number of 8 or greater as mentioned above, the aluminum oxide and the polycarbonate resin. It is preferable that the organic acid is contained as a surface treatment agent for the aluminum oxide.

The amount of the aluminum oxide, more specifically, the organic acid-treated aluminum oxide contained in the polycarbonate resin composition is generally 0.1 to 70 wt % on the basis of the percentage of the aluminum oxide in the solid content of the polycarbonate resin composition except for the solvent. The lower limit of the content amount of the aluminum oxide in the polycarbonate resin composition is preferably 3 wt %, more preferably 5 wt %, in order to improve the mechanical strength, rigidity (elastic modulus) and dimensional stability of the resin composition. The upper limit of the content amount of the aluminum oxide in the polycarbonate resin composition is preferably 67 wt %, more preferably 60 wt %, most preferably 50 wt %, in order to ensure the toughness (property of not being brittle but being tough) and molding fluidity of the resin composition.

Herein, the content amount of the aluminum oxide in the polycarbonate resin composition is indicated on a $Al_2O_3$ basis and determined by measuring an ash content of the resin composition as will be described later in the section of Examples. In the present invention, the aluminum oxide is represented by $Al_2O_3 \cdot nH_2O$ where n is 0 or larger, generally 3 or smaller, i.e. in mixture form as mentioned above. In the case of preparing the polycarbonate resin composition by using such aluminum oxide, the amount of the aluminum oxide used is different from the amount of the aluminum oxide in the prepared polycarbonate resin composition by an amount of the crystalline water $nH_2O$. The content amount of the aluminum oxide is thus indicated on a $Al_2O_3$ basis in the present invention.

For the same reasons as above, the amount of the organic acid contained in the polycarbonate resin composition is preferably 0.01 to 200 wt %, more preferably 0.1 to 100 wt % relative to the amount of the aluminum oxide in the polycarbonate resin composition. It is preferable that the content amount of the organic acid in the polycarbonate resin composition is 5 parts by weight or more, more preferably 7 parts by weight or more, and is 200 parts by weight or less, more preferably 100 parts by weight or less, per 100 parts by weight of the aluminum oxide. It is further preferable that the amount of the organic acid is 0.1 to 2 mmol, preferably 0.5 to 1.5 mmol, per 1 g of the aluminum oxide. In this case, the aluminum oxide amount corresponds to that used for preparation of the polycarbonate resin composition.

The polycarbonate resin composition of the present invention may further contain an impact resistance improving agent for elastomer and rubber as needed. In general, the existence of an impact resistance improving agent in a transparent resin matrix leads to phase separation. In order to prevent transparency deterioration due to light scattering, it is desirable that the refractive index of the impact resistance improving agent is as close to that of the resin matrix as possible. Further, the polycarbonate resin composition of the present invention may contain an additive or additives such as heat stabilizer of phosphate type (e.g. tris(2,4-di-tert-butylphenyl)phosphate commonly used under the trade name of "MARK2112") etc., UV absorber of benzotriazole type etc., plasticizer, lubricant, mold release agent, pigment and antistatic agent. For example, there can be added any additive or additives such as hindered phenol stabilizer as typified by Irganox 1010 and Irganox 1070 (available from Chiba-Geigy KK), partially-acrylated polyphenol stabilizer as typified by Sumilizer GS and Sumilizer GM (available from Sumitomo Chemical Co., Ltd.), phosphorus compound e.g. phophosphate stabilizer as typified by Irgaphos 168 (available from Chiba-Geigy KK) and Adetastab LA-31, long-chain aliphatic alcohols and long-chain aliphatic esters for improvement in heat stability during molding.

[Production Process of Polycarbonate Resin Composition]

The following methods (1) to (3) can be adopted for production of the polycarbonate resin composition of the present invention.

(1) Direct mixing method in which the organic acid, the dispersion liquid or powder of the aluminum oxide and the polycarbonate resin are heated and melt-mixed together, thereby forming the polycarbonate resin composition containing the organic acid with the aluminum oxide uniformly dispersed in the resin composition.

(2) Method in which the aluminum oxide dispersion liquid, applied as it is in the case of using the aluminum oxide dispersion liquid and, in the case of using the aluminum oxide powder, prepared by dispersing the aluminum oxide powder in the desired dispersant, is mixed with the organic acid and the monomers of the polycarbonate resin, followed by causing polymerization of the monomers in the resulting reaction solution, thereby forming the polycarbonate resin composition containing the organic acid with the aluminum oxide uniformly dispersed in the resin composition.

(3) Method in which either the aluminum oxide dispersion liquid, applied as it is in the case of using the aluminum oxide dispersion liquid and, in the case of using the aluminum oxide powder, prepared by dispersing the aluminum oxide powder in the desired dispersant, or the aluminum oxide powder is mixed by stirring with the organic solvent containing the polycarbonate resin and the organic acid, followed by evaporating the solvent from the resulting mixed solution under required temperature and pressure conditions, thereby forming the polycarbonate resin composition containing the organic acid with the aluminum oxide uniformly dispersed in the resin composition.

In the direct mixing method (1), the melt-mixing can be performed by selecting and using a suitable mixer, such as a common biaxial mixing extruder, a Labo-Plast mill, a roll mixer, etc., depending on the production scale. It is alternatively conceivable to use a technique of mixing the materials after applying a strong shear force to the material in dry solid form or at temperatures near the glass transition point.

In the method (2), the polymerization of the monomers can be performed by phosgene process that involves condensation reaction of a dihydroxy compound with phosgene, ester interchange process that involves ester interchange reaction of a dihydroxy compound and ester, or the like.

In the method (3), the viscosity of the solution increases with the amount of the solvent at the time of, after mixing the organic solvent containing the polycarbonate resin with the organic acid and the aluminum oxide by stirring, evaporating the solvent from the solution. It is however preferable to continue stirring the solution until it becomes impossible to stir the solution. This allows the aluminum oxide to be dispersed more uniformly, without aggregation, in the polycarbonate resin composition. It is conceivable to reduce the amount of the solvent by an apparatus with no stirring mechanism (or with weak stirring effect) such as a thin-film evaporator, a kneader, a spray drier, a slurry drier etc.

In the above methods (1) to (3), it is preferable to, in advance of mixing the aluminum oxide with the polycarbonate resin, treat the aluminum oxide with the organic acid by the above-mentioned technique and then mix the aluminum oxide with the polycarbonate resin in order that the organic acid effectively acts on the aluminum oxide to further improve the dispersibility of the aluminum oxide in the polycarbonate resin composition and secure the transparency, fluidity, heat stability and dimensional stability of the polycarbonate resin composition. In this way, in the case of producing the polycarbonate resin composition by treating the aluminum oxide with the organic acid and then mixing the aluminum oxide with the polycarbonate resin, the method (1) is preferred in terms of the production efficiency of the polycarbonate resin composition (i.e. without the need for the solvent removing process; and the method (3) is preferred in terms of the dispersibiltiy of the aluminum oxide in the polycarbonate resin composition.

In the case of applying the aluminum oxide powder in the above methods (1) to (3), it is preferable that the aluminum oxide powder is in a state where the aggregation of the particles is minimized, e.g. in powder form obtained by freeze drying, spray drying or slurry drying, in terms of the dispersibility of the aluminum oxide in the polycarbonate resin compositions.

In the case of mixing the dispersion liquid of the aluminum oxide with either the polycarbonate resin or the solution of the polycarbonate resin, there can be used water and/or organic solvent cited in the section of "Surface Treatment of Aluminum Oxide" as the dispersion medium for preparation of the aluminum oxide dispersion liquid. It is particularly preferable to use the organic solvent as the dispersion medium for mixing with the organic solvent containing the polycarbonate resin. The concentration of the aluminum oxide in the aluminum oxide dispersion liquid is preferably 0.1 to 80 wt %, more preferably 0.1 to 50 wt %, as in the case of the above-mentioned aluminum oxide surface treatment.

On the other hand, in the case of mixing the solution of the polycarbonate resin with the powder or dispersion liquid of the aluminum oxide, there is no particular restriction on the organic solvent used for preparation of the polycarbonate resin solution. There can be used any organic solvent capable of dissolving therein the polycarbonate resin uniformly and causing no adverse effect such as side reaction during the mixing. Examples of the organic solvent are: cyclic ethers such as tetrahydrofuran, 1,3-dioxolane and 1,4-dioxane; alkyl halides such as dichloromethane and chloroform; halogenated aromatic hydrocarbons such as chlorobenzene and dichlorobenzene; amides such as N,N-dimethylformamide and N-methylpyrrolidone; and cyclohexanone. These organic solvents can be used solely or in combination of two or more thereof. The reaction solvent for production of the polycarbonate resin can be used as it is as the organic solvent for preparation of the polycarbonate resin solution. If the polycarbonate resin concentration is too high, the polycarbonate resin solution becomes high in viscosity and difficult to handle during the production. If the polycarbonate resin concentration is too low, there arises a large load in the subsequent solvent removing process. Thus, the concentration of the polycarbonate resin in the polycarbonate resin solution is preferably 1 to 20 wt %, more preferably 5 to 15 wt %.

[Physical Properties of Polycarbonate Resin Composition]
<Dispersion State of Aluminum Oxide>

There is no particular restriction on the dispersion state of the aluminum oxide in the polycarbonate resin composition of the present invention. It is preferable that the primary particles of the aluminum oxide are dispersed substantially separately and uniformly in the polycarbonate resin in order to ensure the transparency, dimensional stability and mechanical properties of the polycarbonate resin composition. The dispersion state of the aluminum oxide in the polycarbonate resin composition can be confirmed by observing the polycarbonate resin composition with a transmission electron microscope (TEM).

<Melt Fluidity>

It is preferable that the polycarbonate resin composition of the present invention has high melt fluidity (or equivalently, low apparent melt viscosity) to show good moldability during various molding processes (injection molding, press molding, injection press molding, extrusion molding etc.). More specifically, the apparent melt viscosity of the polycarbonate resin composition is in general 20000 Pa·s or lower, preferably 10000 Pa·s or lower, more preferably 8000 Pa·s or lower, under the conditions of a temperature of 230° C. and a shear rate of 500 second$^{-1}$. The lower limit of the apparent melt viscosity is generally 1000 Pa·s. The apparent melt viscosity can be measured with a commercially available melt viscosity measurement machine (e.g. a capilograph or a flow tester) under the condition of a nozzle dimension of L/D=8½.

Further, the polycarbonate resin composition of the present invention is characterized in that the melt mass flow rate of the polycarbonate resin composition is 11 g/10 min or higher as measured according to JIS K 7210 "Test Method for Melt Flow Rate of Thermoplastics" under the conditions of a temperature of 280° C., a nominal load of 2.16 Kg and a nozzle dimension L/D of 8/2. In the present invention, the melt mass flow rate is preferably 15 g/10 min or higher, more preferably 20 g/10 min or higher. The upper limit of the melt mass flow rate is generally 200 g/10 min or lower.

If the melt mass flow rate of the polycarbonate resin composition is too low, the polycarbonate resin composition decreases in moldability during various molding processes (e.g. injection molding, press molding, injection press molding, extrusion molding etc.) and puts a restriction on the flexibility in molding shape due to limited molding conditions. On the other hand, if the melt mass flow rate of the polycarbonate resin composition is too high, the polycarbonate resin composition shows too high fluidity during the molding and thus presents the molding stability problem such that the resin composition becomes out of control or there occur burrs on the molded product.

<Breaking Stress>

The polycarbonate resin composition of the present invention is characterized in that breaking stress of the polycarbonate resin composition is 8 MPa or higher. In the present invention, the breaking stress is preferably 10 MPa or higher, more preferably 15 MPa or higher. Although it is generally desired that the resin composition has as high a breaking stress as possible, the upper limit of the breaking stress is 500 MPa or lower. If the breaking stress is too low, the resin composition cannot maintain sufficient material strength by itself.

The breaking stress can be measured by, after melt-mixing the resin composition, heat-press molding the resin composition into a film of 0.2 mm in thickness, cutting the film into a No. 2 dumbbell-shaped specimen (0.2 mm in thickness) according to JIS K 7113 and testing the specimen with a test instrument "STA1225" available from ORIENTEC Co., Ltd. under the conditions of a temperature of 23° C., a humidity of 50% RH and a tensile rate of 50 mm/min.

<Linear Thermal Expansion Coefficient and Elastic Modulus]

It is preferable in the present invention that the polycarbonate resin composition has a low linear thermal expansion coefficient and a high elastic modulus in terms of the dimensional stability and mechanical strength of the molded product.

The linear thermal expansion coefficient can be measured by, after melt-mixing the polycarbonate resin composition, forming the resin composition into a cylindrical test specimen of 5 mm in bottom surface diameter and 10 mm in length and testing a change in length dimension of the specimen within a temperature range of 30° C. to 60° C. under the conditions of a load of 20 g and a temperature rise rate of 5° C./m in a nitrogen atmosphere with a dilatometer "TD5000" available from Bruker Axe Corp. (former Mac Science Corp.). In terms of the dimensional stability, the linear thermal expansion coefficient of the polycarbonate resin composition is preferably 60 ppm/K or lower, more preferably 50 ppm/K or lower. Although it is desired that the resin composition has as low a linear thermal expansion coefficient as possible, the lower limit of the linear thermal expansion coefficient is generally 10 ppm/K.

The elastic modulus can be measured by bending elastic modulus test according to JIS K 7171, or by, after melt-mixing the polycarbonate resin composition, heat-press molding the polycarbonate resin composition into a film of 0.2 mm in thickness as a test specimen, cutting the film into a size of 40 mm×8 mm and testing the cut sample under the conditions of a temperature of 23° C. and a humidity of 50% RH with a test instrument "DMS" available from SIT Corporation. In terms of the improvement in the mechanical strength (ridigidy) of the polycarbonate resin composition, the elastic modulus of the polycarbonate resin composition is preferably 2.7 GPa or higher, more preferably 4 GPa or higher, as measured by the latter measurement method. Although it is desired that the resin composition has as high an elastic modulus as possible, the upper limit of the elastic modulus is generally lower than or equal to the elastic modulus of the aluminum oxide, i.e., 600 GPa or lower.

If the elastic modulus is too low, there arises a problem that the resin composition cannot attain sufficient material rigidity (mechanical strength).

<Haze Value>

The polycarbonate resin composition of the present invention preferably has a haze value of 20 or smaller, more preferably 15 or smaller. Although it is generally preferable that the haze value is as small as possible, the lower limit of the haze value is 0.1 or greater. If the haze value is too great, there arises a problem that the resin composition cannot be used as a transparent window material etc. because of poor visibility.

The haze value can be measured by, after melt-mixing the polycarbonate resin composition, heat-press molding the polycarbonate resin composition into a film of 0.2 mm in thickness and testing the film with a haze meter ("Haze Computer HZ-2" available from Suga Test Instruments Co., Ltd.) according to JIS K 7105.

<Molecular Weight Decrease of Polycarbonate Resin>

The polycarbonate resin composition of the present invention, produced by mixing the polycarbonate resin and the aluminum oxide, can limit the decrease in molecular weight of the polycarbonate resin due to the effect of preventing hydrolysis of the polycarbonate resin by the aluminum oxide with the use of the organic acid.

<Effect of Organic Acid on Physical Properties>

As described above, the polycarbonate resin composition of the present invention contains the organic acid and the aluminum oxide and is characterized in that: the melt mass flow rate of the resin composition is 11 g/10 min or higher as measured according to JIS K 7210 under the conditions of a temperature of 280° C., a nominal load of 2.16 Kg and a nozzle dimension L/D of 8/2; and the breaking stress of the film of 0.2 mm in thickness formed by heat-press molding the resin composition is 8 MPa or higher as measured according to JIS K 7113 under the conditions of a temperature of 23° C., a humidity of 50% RH and a tensile rate of 50 mm/min. A conventional aluminum oxide-containing polycarbonate resin composition has the problems that: the mechanical strength of the resin composition becomes lowered due to hydrolysis of the polycarbonate resin on the surface of aluminum oxide; and the resin composition has poor fluidity and thus show low moldability due to the strong interaction between aluminum oxide surfaces. By contrast, it is possible that the polycarbonate resin composition of the present invention can prevent hydrolysis of the polycarbonate resin on the aluminum oxide surface and maintain its mechanical strength, while limiting the interaction between aluminum oxide surfaces to obtain high fluidity and good moldability, by the use of the organic acid.

In the present invention, the elastic modulus of the film of 0.2 mm in thickness formed by heat-press molding the polycarbonate resin composition is preferably 2.7 GPa or higher as measured under the conditions of a temperature of 23° C. and a humidity of 50% RH. As the use of the organic acid enables good dispersion of the aluminum oxide, it is possible that the polycarbonate resin composition of the present invention can attain effectively improved mechanical strength (elastic modulus) even though the amount of the aluminum oxide added is small.

Further, the haze value of the film of 0.2 mm in thickness formed by heat-press molding the polycarbonate resin composition is preferably 20 or smaller as measured according to JIS K 7105. It is possible that the polycarbonate resin composition of the present invention can attain such high transparency as the use of the organic acid enables good dispersion of the aluminum oxide.

[Use of Polycarbonate Resin Composition]

The polycarbonate resin composition of the present invention combines good properties such as transparency, dimensional stability, mechanical strength and heat stability with high moldability and thus can suitably be used for automotive interior parts such as transparent instrument panel cover and automotive exterior parts such as window pane (window), headtorch, sunroof and combination lamp cover and can also suitably be used as an alternative material to glass for transparent parts of household electrical appliances, houses, accessories and furnishings.

EXAMPLES

The present invention will be described in more detail below by way of the following examples. It should be however noted that the present invention is not limited to these examples unless departing from the scope of the prevent invention. Herein, the analysis/measurement methods of the respective items are as follows.

(1) Weight Average Molecular Weight (Mw)/Number-Average Molecular Weight (Mn)

The molecular weight was determined by preparing a 0.1 wt % chloroform solution of a resin composition, filtering an insoluble content by a 0.45-μm filter and analyzing only a soluble content by gel permeation chromatography (GPC).
(GPS analysis condition)
Instrument: HLC-8220GPC available from Tosoh Corporation
Column: TSK GEL SUPER HZM-M available from Tosoh Corporation
Column temperature: 40° C.
Detector: UV-8220 (254 nm) available from Tosoh Corporation
Mobile phase: CHCl3 (reagent chemical)
Calibration: Polystyrene basis
Injection amount: 0.1 wt %×10 μL
The analysis of the average molecular weight was performed only for a high molecular weight component at a peak split at a low molecular weight side minimum point of a peak including an elution position of polystyrene with a molecular weight of 400.

(2) Fluidity

The fluidity was determined by charging 2 g of a resin composition into a cylinder of a micromixer (Micro mixing-injection molding machine available from Imoto Corporation), holding the resin composition at 270° C. or 230° C. for 2 minutes, mixing the resin composition at 20 rpm for 5 minutes, and then, extruding the resin composition. The rating of the fluidity was performed as follows: "◯" when the extrusion amount was 90 wt % or more of the injected resin composition; "Δ" when the extrusion amount was from 5 wt % to less than 90 wt % of the injected resin composition; and "X" when the extrusion amount was less than 5 wt % of the injected resin composition.

(3) Linear Thermal Expansion Coefficient

The linear thermal expansion coefficient was determined by, after melt-mixing a resin composition, molding the resin composition into a cylindrical test specimen of 5 mm in bottom surface diameter and 10 mm in length and measuring a change in length dimension of the specimen within a temperature range of 30° C. to 60° C. under the conditions of a load of 20 g and a temperature rise rate of 5° C./m in a nitrogen atmosphere with a dilatometer "TD5000" available from Bruker Axe Corp. (former Mac Science Corp.). Before the measurement, the test specimen was heated to 100° C. at a temperature rise rate of 5° C./min. The measurement was performed after cooling the test specimen down to room temperature. Further, quartz was used as a standard sample; and temperature correction was made based on fusing temperatures (softening temperatures) of Ga and In.

(4) Elastic Modulus

The elastic modulus was determined by, after melt-mixing a resin composition, heat-press molding the resin composition into a film of 0.2 mm in thickness as a test specimen, cutting the film into a size of 40 mm×8 mm and testing the cut sample under the conditions of a temperature of 23° C. and a humidity of 50% RH with a test instrument "DMS" available from SII Corporation.

(5) Haze Value

The haze value was measured by, after melt-mixing a resin composition, heat-press molding the resin composition into a film of 0.2 mm in thickness as a test specimen and testing the film with a haze meter ("Haze Computer HZ-2" available from Suga Test Instruments Co., Ltd.) according to JIS K 7105.

(6) Ash Content

The ash content was determined by placing a resin composition on a platinum pan in a test instrument "TG-DTA320" available from Seiko Instruments Inc., heating the resin composition from room temperature (about 23° C.) to 600° C. at a temperature rise rate of 10° C./min and holding the resin composition for 30 minutes to measure the amount of weight reduction of the resin composition. The weight percent of the residual component with respect to the original resin composition was calculated, as the ash content, from the weight reduction amount.

(7) Melt Mass Flow Rate

The melt mass flow rate was determined, after melt-mixing the resin composition, according to JIS K 7210 under the conditions of S (a temperature of 280° C., a nominal load of 216 Kg) and a nozzle dimension L/D of 8/2

(8) Breaking Stress

The breaking stress was determined by, after melt-mixing a resin composition, heat-press molding the resin composition into a film of 0.2 mm in thickness, cutting the film into a No. 2 dumbbell-shaped specimen (0.2 mm in thickness) according to JIS K 7113 and testing the specimen with a test instrument "STA 1225" available from ORIENTEC Co., Ltd. under the conditions of a temperature of 23° C., a humidity of 50% RH and a tensile rate of 50 mm/min. The value of stress under which a break occurred in the film was calculated as the breaking stress.

REFERENCE EXAMPLE 1

Synthesis of Needle-Like Boehmite

Needle-like boehmite was synthesized by the method disclosed in Example 2 of Japanese Laid-Open Patent Publication No. 2006-62905.

Namely, aluminum oxide hexahydrate (2.0 M, 40 ml, 25° C.) was put into a beaker made of Teflon (registered trademark) and equipped with a mechanical stirrer, followed by dropping sodium hydroxide (5.10 M, 40 ml, 25° C.) into the beaker for about 6 minutes while stirring the mixed solution (700 rpm) and keeping the beaker at 10° C. in a thermostatic bath. The stirring was continued for 10 minutes after the dropping. After the stirring, the pH of the solution was measured (pH=7.08). The solution was then put and sealed into an autoclave with a Teflon (registered trademark) liner. The autoclave was placed in an oil bath and heated at 180° C. for 8 hours. After that, the autoclave was cooled by running water. The contents of the autoclave were subjected to centrifugal separation (30000 rpm, 30 min). After removing the supernatant fluid, the residual substance was subjected to centrifugal washing three times. The above operation was repeated to collect the separated precipitate. The precipitate was mixed with distilled water by mechanical stirring, thereby yielding an aqueous dispersion system (hydrosol) of boehmite particles.

The size of the particles was examined with a transmission electron microscope (TEM). The particles had a needle-like shape with a major axis length of about 100 to 200 nm, a minor axis length (diameter) of 5 to 6 nm and an aspect ratio of 16 to 40.

REFERENCE EXAMPLE 2

Solvent Exchange to Convert Hydrosol of Boehmite into Dioxane Sol

A flask was charged with 200 g of the boehmite hydrosol (boehmite concentration: 10 wt %) synthesized in Reference Example 1 and 800 g of 1,4-dioxane. While stirring the contents of the flask well with a mechanical stirrer, the contents of the flask was heated at 100° C. by means of an oil bath to evaporate 200 g of the water and 1,4-dioxane. The above operation of adding 200 g of 1,4-dioxane into the flask and evaporating 200 g of the water and 1,4-dioxane by heating the flask contents at 100° C. while stirring the flask contents in the same manner as above. A dioxane sol of the boehmite particles was obtained by adjusting the amount of the 1,4-dioxane in such a manner that the solid matter content of the sol in the flask became 2 wt %.

Example 1

A flask was charged with 100 of the dioxane sol of the boehmite particles (boehmite concentration: 2 wt %) obtained in Reference Example 2, followed by adding thereto 0.34 g (1.04 mmol) of dodecylbenzenesulfonic acid (available from Tokyo Chemical Industry Co., Ltd.) for about 5 minutes while stirring the contents of the flask well with a mechanical stirrer. After the adding, the resulting sol was stirred for 30 minutes at room temperature. This boehmite sol was mixed with 50 g of a 8.7 wt % dichloromethane solution of polycarbonate (available as "NOVAREX 7030A (registered trademark)" from Mitsubishi Engeering-Plastics Corporation, weight-average molecular weight: $6.5 \times 10^4$, number-average molecular weight: $1.3 \times 10^4$). The solvent was evaporated from the sol, thereby obtaining a boehmite-polycarbonate resin composition (boehmite content: 30 wt %, dodecylbenzenesulfonic acid content: 5 wt %). After drying the resin composition for one night at 120° C. under the vacuum condition of 0.8 KPa, the resin composition was held at 270° C. for 2 seconds and mixed and extruded at 20 rpm for 5 minutes by a micromixer ("Micro mixing-injection molding machine" available from Imoto Corporation).

The ash content of the resin composition was 24 wt %; and the weight-average molecular weight and number-average molecular weight of the resin composition were $2.14 \times 10^4$ and $0.49 \times 10^4$, respectively, according to the GPC analysis. Further, the extrudability (or equivalently, fluidity) of the resin composition as measured by the micromixer at 270° C. and at 230° C. was favorable.

Example 2

A sol was prepared in the same manner as in Example 1, except that 0.5 g (1.04 mmol) of dinonylnaphthalene sulfonic acid (available from "Aldrich, Inc.") was used in place of the dodecylbenzenesulfonic acid. The resulting sol was mixed with 47 g of a 8.7 wt % dichloromethane solution of polycarbonate (7030A), thereby obtaining a boehmite-polycarbonate resin composition (boehmite content: 30 wt %, dinonylnaphthalene sulfonic acid content: 7.6 wt %). The resin composition was dried and extruded by a micromixer in the same manner as in Example 1.

The ash content of the resin composition was 30 wt %; and the weight-average molecular weight and number-average molecular weight of the resin composition were $1.94 \times 10^4$ and $0.93 \times 10^4$, respectively, according to the GPC analysis. The extrudability (or equivalently, fluidity) of the resin composition as measured by the micromixer at 270° C. and at 230° C. was favorable.

Example 3

A sol was prepared in the same manner as in Example 1 and mixed with 110 g of a 8.7 wt % dichloromethane solution of polycarbonate (7030A), thereby obtaining a boehmite-polycarbonate resin composition (boehmite content: 17 wt %, dodecylbenzenesulfonic acid content: 2.9 wt %). The resin composition was dried and extruded by a micromixer in the same manner as in Example 1.

The ash content of the resin composition was 13 wt %; and the weight-average molecular weight and number-average molecular weight of the resin composition were $3.40 \times 10^4$ and $0.78 \times 10^4$, respectively, according to the GPC analysis. The extrudability (or equivalently, fluidity) of the resin composition as measured by the micromixer at 270° C. and at 230° C. was favorable.

Example 4

A sol was prepared in the same manner as in Example 1, except for using 0.17 g (0.52 mmol) of dodecylbenzenesulfonic acid (available from Tokyo Chemical Industry Co., Ltd.). The resulting sol was mixed with 50 g of a 8.7 wt % dichloromethane solution of polycarbonate (7030A), thereby obtaining a boehmite-polycarbonate resin composition (boehmite content: 30 wt %, dodecylbenzenesulfonic acid content: 2.6 wt %). The resin composition was dried and extruded by a micromixer in the same manner as in Example 1.

The ash content of the resin composition was 22 wt %; and the weight-average molecular weight and number-average molecular weight of the resin composition were $1.61 \times 10^4$ and $0.35 \times 10^4$, respectively, according to the GPC analysis. The extrudability (or equivalently, fluidity) of the resin composition as measured by the micromixer at 270° C. and at 230° C. was favorable.

Example 5

A sol was prepared in the same manner as in Example 1, except for using 0.68 g (2.08 mmol) of dodecylbenzenesulfonic acid (available from Tokyo Chemical Industry Co., Ltd.). The resulting sol was mixed with 46 g of a 8.7 wt % dichloromethane solution of polycarbonate (7030A), thereby obtaining a boehmite-polycarbonate resin composition (boehmite content: 30 wt %, dodecylbenzenesulfonic acid content: 10 wt %). The resin composition was dried and extruded by a micromixer in the same manner as in Example 1.

The ash content of the resin composition was 23 wt %; and the weight-average molecular weight and number-average molecular weight of the resin composition were $2.12 \times 10^4$ and $0.48 \times 10^4$, respectively, according to the GPC analysis. The extrudability (or equivalently, fluidity) of the resin composition as measured by the micromixer at 270° C. and at 230° C. was favorable.

Example 6

The aqueous boehmite dispersion liquid obtained in Reference Example 1 was adjusted in such a manner that the boehmite concentration became 5 wt %. A flask was charged with 300 g of the adjusted dispersion liquid, followed by adding thereto 2.55 g (7.8 mmol) of dodecylbenzenesulfonic acid (available from Tokyo Chemical Industry Co., Ltd.) for about 5 minutes while stirring the contents of the flask well with a mechanical stirrer. After the adding, the dispersion liquid was stirred for 30 minutes at room temperature. This boehmite dispersion liquid was placed still in a freeze dryer ("DRC-1000/FDU-2100" available from Tokyo Rika Kikai Co., Ltd.) and frozen at −40° C. for 3 hours in the air. The chamber of the freeze dryer was placed under vacuum (10 Pa or lower). After that, the boehmite dispersion liquid was dried at −40° C. for 72 hours and dried at 30° C. for 3 hours. Water was removed by freeze drying from the solution to yield a powder of the boehmite particles treated with the dodecylbenzenesulfonic acid. The resulting boehmite powder was mixed with 200 g of tetrahydrofuran, followed by stirring the mixed solution for 30 minutes at room temperature. The resulting dispersion solution was mixed with 845 g of a 8.7 wt % dichloromethane solution of polycarbonate (7030A). The solvent was evaporated from the solution, thereby obtaining a boehmite-polycarbonate resin composition (boehmite content: 16.5 wt %, dodecylbenzenesulfonic acid content: 2.8 wt %). The resin composition was dried and extruded by a micromixer in the same manner as in Example 1.

The ash content of the resin composition was 14 wt %; and the weight-average molecular weight and number-average molecular weight of the resin composition were $3.2 \times 10^4$ and $0.6 \times 10^4$, respectively, according to the GPC analysis. The extrudability (or equivalently, fluidity) of the resin composition as measured by the micromixer at 270° C. and at 230° C. was favorable.

Example 7

A sol was prepared in the same manner as in Example 6, except for using 5.10 g (15.6 mmol) of dodecylbenzenesulfonic acid. The resulting sol was mixed with 816 g of a 8.7 wt % dichloromethane solution of polycarbonate (7030A), thereby obtaining a boehmite-polycarbonate resin composition (boehmite content: 16.5 wt %, dodecylbenzenesulfonic acid content: 5.6 wt %). The resin composition was dried and extruded by a micromixer in the same manner as in Example 1.

The ash content of the resin composition was 14 wt %; and the weight-average molecular weight and number-average molecular weight of the resin composition were $3.2 \times 10^4$ and $0.9 \times 10^4$, respectively, according to the GPC analysis. The extrudability (or equivalently, fluidity) of the resin composition as measured by the micromixer at 270° C. and at 230° C. was favorable.

Example 8

A sol was prepared in the same manner as in Example 6, except for using 1.28 g (3.9 mmol) of dodecylbenzenesulfonic acid. The resulting sol was mixed with 860 g of a 8.7 wt % dichloromethane solution of polycarbonate (7030A), thereby obtaining a boehmite-polycarbonate resin composition (boehmite content: 16.5 wt %, dodecylbenzenesulfonic acid content: 1.4 wt %). The resin composition was dried and extruded by a micromixer in the same manner as in Example 1.

The ash content of the resin composition was 14 wt %; and the weight average molecular weight and number-average molecular weight of the resin composition were $3.1 \times 10^4$ and $0.5 \times 10^4$, respectively, according to the GPC analysis. The extrudability (or equivalently, fluidity) of the resin composition as measured by the micromixer at 270° C. and at 230° C. was favorable.

Example 9

A powder of the boehmite particles treated with dodecylbenzenesulfonic acid was obtained by the same freeze drying technique as in Example 6, except for using 3.60 g (11.0 mmol) of the dodecylbenzenesulfonic acid. Then, 10 g of the boehmite powder was melt-mixed with 39.4 g of pellets of polycarbonate (7030A) at a mixing temperature of 230° C. at a mixing rate of 100 rpm for 5 minutes by a Labo-Plast mill ("10C-100" available from Toyo Seiki Co., Ltd.), thereby obtaining a boehmite-polycarbonate resin composition (boehmite content: 16.5 wt %, dodecylbenzenesulfonic acid content: 4.0 wt %). The resin composition was dried and extruded by a micromixer in the same manner as in Example 1.

The ash content of the resin composition was 14 wt %; and the weight-average molecular weight and number-average molecular weight of the resin composition were $3.6 \times 10^4$ and $0.8 \times 10^4$, respectively, according to the GPC analysis. The extrudability (or equivalently, fluidity) of the resin composition as measured by the micromixer at 270° C. and at 230° C. was favorable.

Comparative Example 1

A sol was prepared in the same manner as in Example 1, except that 0.2 g (1.04 mmol) of p-toluenesulfonic acid monohydrate (available from Kishida Chemical Co., Ltd.) was used in place of the dodecylbenzenesulfonic acid. The resulting sol was mixed with 50 g of a 8.7 wt % dichloromethane solution of polycarbonate (7030A), thereby obtaining a boehmite-polycarbonate resin composition (boehmite content: 30 wt %, p-toluenesulfonic acid content: 3 wt %). The resin composition was dried and extruded by a micromixer in the same manner as in Example 1.

The ash content of the resin composition was 24 wt %; and the weight-average molecular weight and number-average molecular weight of the resin were $1.92 \times 10^4$ and $0.48 \times 10^4$, respectively, according to the GPC analysis. It was difficult to extrude the resin composition by the micromixer at 270° C. and was impossible to extrude the resin composition by the micromixer at 230° C.

Comparative Example 2

A sol was prepared in the same manner as in Example 1, except that 0.18 g (1.04 mmol) of phenylphosphonic acid (available from Tokyo Chemical Industry Co., Ltd.) was used in place of the dodecylbenzenesulfonic acid. The resulting sol was mixed with 50 g of a 8.7 wt % dichloromethane solution of polycarbonate (7030A), thereby obtaining a boehmite-polycarbonate resin composition (boehmite content: 30 wt %, phenylphosphonic acid content: 2.8 wt %). The resin composition was dried and extruded by a micromixer in the same manner as in Example 1.

The ash content of the resin composition was 22 wt %; and the weight-average molecular weight and number-average molecular weight of the resin were $0.55 \times 10^4$ and $0.17 \times 10^4$, respectively, according to the GPC analysis. It was impossible to extrude the resin composition by the micromixer at 270° C. and at 230° C.

Comparative Example 3

A sol was prepared in the same manner as in Example 1, except that 0.40 g (1.04 mmol) of a phosphoric ester compound (mono or bis(butoxyethyl) phosphate available under the trade name of "JP506" from Johoku Chemical Co., Ltd.) was used in place of the dodecylbenzenesulfonic acid. The resulting sol was mixed with 49 g of a 8.7 wt % dichloromethane solution of polycarbonate (7030A), thereby obtaining a boehmite-polycarbonate resin composition (boehmite content: 30 wt %, phosphoric ester compound content: 2.8 wt %). The resin composition was dried and extruded by a micromixer in the same manner as in Example 1.

The ash content of the resin composition was 24 wt %; and the weight-average molecular weight and number-average molecular weight of the resin were $0.88 \times 10^4$ and $0.34 \times 10^4$, respectively, according to the GPC analysis. The extrudability (or equivalently, fluidity) of the resin composition as measured by the micromixer at 270° C. and at 230° C. was favorable.

Comparative Example 4

A sol was prepared in the same manner as in Example 6, except that 1.5 g (7.8 mmol) of p-toluenesulfonic acid monohydrate (available from Kishida Chemical Co., Ltd.) was used in place of the dodecylbenzenesulfonic acid. The resulting sol was mixed with 856 g of a 8.7 wt % dichloromethane solution of polycarbonate (7030A), thereby obtaining a boehmite-polycarbonate resin composition (boehmite content: 16.5 wt %, p-toluenesulfonic acid content: 1.6 wt %). The resin composition was dried and extruded by a micromixer in the same manner as in Example 1.

The ash content of the resin composition was 14 wt %; and the weight-average molecular weight and number-average molecular weight of the resin were $3.0 \times 10^4$ and $0.6 \times 10^4$, respectively, according to the GPC analysis. It was difficult to extrude the resin composition by the micromixer at 270° C. and was impossible to extrude the resin composition by the micromixer at 230° C.

Comparative Example 5

A sol was prepared in the same manner as in Example 6, except that 3.0 g (7.8 mmol) of a phosphoric ester compound (available under the trade name of "JP506H" from Johoku Chemical Co., Ltd.) was used in place of the dodecylbenzenesulfonic acid. The resulting sol was mixed with 840 g of a 8.7 wt % dichloromethane solution of polycarbonate (7030A), thereby obtaining a boehmite-polycarbonate resin composition (boehmite content: 16.5 wt %, phosphoric ester compound content: 3.3 wt %). The resin composition was dried and extruded by a micromixer in the same manner as in Example 1.

The ash content of the resin composition was 14 wt %; and the weight-average molecular weight and number-average molecular weight of the resin were $2.3 \times 10^4$ and $0.5 \times 10^4$, respectively, according to the GPC analysis. It was difficult to extrude the resin composition by the micromixer at 270° C. and was impossible to extrude the resin composition by the micromixer at 230° C.

Comparative Example 6

A sol was prepared in the same manner as in Example 6, except for using 0.45 g (1.38 mmol) of dodecylbenzenesulfonic acid. The resulting sol was mixed with 870 g of a 8.7 wt % dichloromethane solution of polycarbonate (7030A), thereby obtaining a boehmite-polycarbonate resin composition (boehmite content: 16.5 wt %, phosphoric ester compound content: 0.50 wt %). The resin composition was dried and extruded by a micromixer in the same manner as in Example 1.

The ash content of the resin composition was 14 wt %; and the weight-average molecular weight and number-average molecular weight of the resin were $2.8 \times 10^4$ and $0.5 \times 10^4$, respectively, according to the GPC analysis. It was difficult to extrude the resin composition by the micromixer at 270° C. and was impossible to extrude the resin composition by the micromixer at 230° C.

The contents (the amount of $Al_2O_3$ (aluminum nanoparticles) and the kind and amount of the organic acid used) of the resin composition, the weight-average molecular weight and number-average molecular weight of the polycarbonate resin in the polycarbonate resin composition and the melt mass flow rate, mechanical properties (fluidity, elastic modulus and breaking stress), haze value and linear thermal expansion coefficient of the resin composition are summarized in TABLE 1.

TABLE 1

| | Kind of organic acid*[1] (carbon number) | Amount of $Al_2O_3$ in resin composition (ash content: wt %) | Amount of organic acid per 1 g of boehmite*[2] |
|---|---|---|---|
| Example 1 | DBS (18) | 24 | 17 |
| Example 2 | DNNSA (28) | 30 | 17 |
| Example 3 | DBS (18) | 13 | 17 |
| Example 4 | DBS (18) | 22 | 8 |
| Example 5 | DBS (18) | 23 | 34 |
| Example 6 | DBS (18) | 14 | 17 |
| Example 7 | DBS (18) | 14 | 34 |
| Example 8 | DBS (18) | 14 | 8.5 |
| Example 9 | DBS (18) | 14 | 24 |
| Comparative Example 1 | PTS (7) | 24 | 10 |
| Comparative Example 2 | PPA (6) | 22 | 9 |
| Comparative Example 3 | JP506H (9) | 24 | 20 |
| Comparative Example 4 | PTS (7) | 14 | 10 |
| Comparative Example 5 | JP506H (9) | 14 | 20 |
| Comparative Example 6 | DBS (18) | 14 | 3 |

| | Polycarbonate resin composition | | | |
|---|---|---|---|---|
| | Molecular weight $Mw \times 10^4$/ $Mn \times 10^4$ | Fluidity (270° C.) | Fluidity (230° C.) | Melt mass flow rate (g/10 min) |
| Example 1 | 2.14/0.49 | ○ | ○ | 26 |
| Example 2 | 1.94/0.93 | ○ | ○ | 28 |
| Example 3 | 3.40/0.78 | ○ | ○ | 25 |
| Example 4 | 1.61/0.35 | ○ | ○ | 20 |
| Example 5 | 2.12/0.48 | ○ | ○ | 36 |
| Example 6 | 3.2/0.6 | ○ | ○ | 25 |
| Example 7 | 3.2/0.9 | ○ | ○ | 48 |
| Example 8 | 3.1/0.5 | ○ | ○ | 12 |
| Example 9 | 3.6/0.8 | ○ | ○ | 31 |
| Comparative Example 1 | 1.92/0.48 | Δ | X | 3 |
| Comparative Example 2 | 0.55/0.17 | X | X | 2 |
| Comparative Example 3 | 0.88/0.34 | ○ | ○ | 10* |
| Comparative Example 4 | 3.0/0.6 | Δ | X | 5 |
| Comparative Example 5 | 2.3/0.5 | Δ | X | 6 |
| Comparative Example 6 | 2.8/0.5 | Δ | X | 7 |

| | Polycarbonate resin composition | | | |
|---|---|---|---|---|
| | Linear thermal expansion coefficient (ppm/K) | Elastic modulus (GPa) | Haze | Breaking stress (MPa) |
| Example 1 | 49 | 5.4 | 10 | 22 |
| Example 2 | 50 | 5.2 | 10 | 15 |
| Example 3 | 58 | 3.5 | 14 | 56 |
| Example 4 | 49 | 4.1 | 17 | 10 |
| Example 5 | 52 | 4.0 | 10 | 16 |
| Example 6 | 54 | 3.8 | 8 | 53 |
| Example 7 | 58 | 3.8 | 8 | 33 |
| Example 8 | 55 | 3.8 | 18 | 22 |
| Example 9 | 58 | 3.6 | 5 | 38 |
| Comparative Example 1 | 47 | 6.5 | 15 | 10 |
| Comparative Example 2 | 43 | unmeasureable | 40 | unmeasureable |
| Comparative Example 3 | 52 | unmeasureable | 9 | unmeasureable |
| Comparative Example 4 | 54 | 4.3 | 28 | 20 |
| Comparative Example 5 | 56 | 3.8 | 26 | 7 |
| Comparative Example 6 | 56 | 4.0 | 25 | 20 |

*[1]DBS: dodecylbenzenesulfonic acid DNNSA: dinonylnaphthalene sulfonic acid JP506H: phosphoric ester compound PTS: p-toluenesulfonic acid PPA: phenylphosphonic acid
*[2]The amount (wt %) of organic acid relative to the amount of boehmite used for preparation of the resin composition It has been shown in TABLE 1 that the polycarbonate resin composition of the present invention, which contains the organic acid-treated aluminum oxide, has good fluidity and combines mechanical properties, transparency and dimensional stability with less decrease in the molecular weight of the polycarbonate resin.

Although the present invention has been described with reference to the above specific embodiments, it is obvious to those skilled in the art that various modifications and variations of the embodiments described above are possible without departing from the scope of the invention. It is herein noted that: the present application is based on Japanese Patent Application No. 2007-185846; and the entire content of Japanese Patent Application No. 2007-185846 are incorporated by reference.

The invention claimed is:

1. A polycarbonate resin composition containing an organic acid and aluminum oxide,
   wherein the resin composition has a melt mass flow rate of 11 g/10 min or higher as measured according to JIS K 7210 under the conditions of a temperature of 280° C., a nominal load of 2.16 Kg and a nozzle dimension L/D of 8/2;
   wherein a No. 2 dumbbell-shaped specimen according to JIS K 7113 formed by heat, press molding the resin composition into a film of 0.2 mm in thickness and cutting the film has a breaking stress of 8 MPa or higher as measured under the conditions of a temperature of 23° C., a humidity of 50% RH and a tensile rate of 50 mm/min,
   wherein the organic acid is a sulfonic acid having a carbon number of 8 or greater; and
   wherein the organic acid is contained in an amount of 8 to 34 parts by weight per 100 parts by weight of the aluminum oxide.

2. The polycarbonate resin composition according to claim 1, wherein the film of 0.2 mm thickness formed by heat press molding the resin composition has an elastic modulus of 2.7 GPa or higher as measured according to JIS K7171 under the conditions of a temperature of 23° C. and a humidity of 50% RH.

3. The polycarbonate resin composition according to claim 2, wherein the film of 0.2 mm thickness formed by heat press molding the resin composition has a haze value of 20 or smaller as measured according to JIS K 7105.

4. The polycarbonate resin composition according to claim wherein the organic acid has an aromatic ring in the molecule.

5. The polycarbonate resin composition according to claim 1, wherein the aluminum oxide is contained in an amount of 3 to 70% by weight.

6. The polycarbonate resin composition according to claim 1, wherein the aluminum oxide has an aspect ratio of 5 or greater.

7. The polycarbonate resin composition according to claim 1, wherein the aluminum oxide is one kind or two or more kinds selected from the group consisting of boehmite and pseudo boehmite.

8. A production process of the polycarbonate resin composition according to claim 1, comprising:
   treating aluminum oxide with an organic acid having a carbon number of 8 or greater; and then
   mixing the aluminum oxide with a polycarbonate resin, wherein the organic acid is contained in an amount of 8 to 34 parts by weight per 100 parts by weight of the aluminum oxide.

9. The production process of the polycarbonate resin composition according to claim 8, wherein the mixing of the aluminum oxide and the polycarbonate resin is performed using a dispersion liquid of the aluminum oxide and/or a solution of the polycarbonate resin.

10. The production process of the polycarbonate resin composition according to claim 8, wherein the mixing of the aluminum oxide and the polycarbonate resin is performed by melt-mixing the polycarbonate resin with a powder of the aluminum oxide.

* * * * *